United States Patent [19]

Nakacho et al.

[11] Patent Number: 5,183,716
[45] Date of Patent: Feb. 2, 1993

[54] ALL SOLID-STATE BATTERY

[75] Inventors: Yoshifumi Nakacho; Akiyoshi Inubushi; Yuji Tada, all of Tokushima, Japan

[73] Assignee: Otsuka Kagaku Kabushiki Kaisha, Osaka, Japan

[21] Appl. No.: 598,650
[22] PCT Filed: Feb. 21, 1990
[86] PCT No.: PCT/JP90/00208
 § 371 Date: Feb. 21, 1990
 § 102(e) Date: Feb. 21, 1990
[87] PCT Pub. No.: WO90/10315
 PCT Pub. Date: Sep. 7, 1990

[30] Foreign Application Priority Data

Feb. 22, 1989 [JP] Japan .................. 1-44327

[51] Int. Cl.$^5$ ............................ H01M 10/40
[52] U.S. Cl. ........................ 429/192; 429/199
[58] Field of Search ............ 429/30, 33, 46, 192

[56] References Cited

U.S. PATENT DOCUMENTS

| 4,840,856 | 6/1989 | Nakacho et al. | |
| 4,927,793 | 5/1990 | Hori et al. | 929/33 |
| 5,035,962 | 7/1991 | Jensen | 429/40 |
| 5,059,497 | 10/1991 | Prince et al. | 429/30 |
| 5,114,809 | 5/1992 | Nakacho et al. | 429/192 |

Primary Examiner—Anthony McFarlane
Attorney, Agent, or Firm—Armstrong & Kubovcik

[57] ABSTRACT

A solid-state battery having a solid electrolyte represented by $[A]_u \cdot (\{[=N(Z)_2] \cdot (MX)_v\}_w)$, a positive electrode, and a negative electrode. A is a single ionic polymer of at least one of an oligoethylene oxypolyphosphazene compound having a sulfone group and an oligoalkylene oxpolyphosphazene compound having a fluorolakylsulfone group. The respective oxypolyphosphazenes have the structure of one of formulas (I) to (IV):

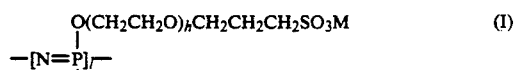

(I)

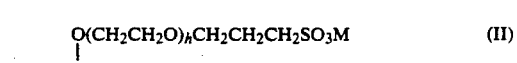

(II)

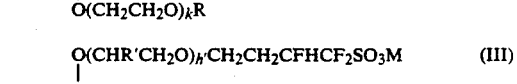

(III)

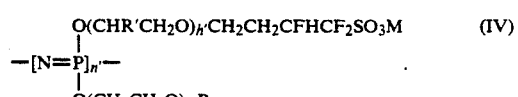

(IV)

R is at least one of methyl, ethyl and propyl. R' is hydrogen or methyl. h, k, h' and k' are each the average number of repeating ethyleneoxy unite or alkyleneoxy units and are each a real number from 0 to 20. l, n, l' and n' are each an integer of 0 or greater in the range of $3 \leq l+n+l'+n' \leq 200{,}000$. Z is a group represented by Y—$(OCH_2CH_2)_y$—O—. Y is at least one of methyl, ethyl and propyl. y is a real number from 1 to 30. M is an element from the main group and subgroup of Groups I and II, transition metals from Groups III to VIII, and lanthanide. x is at least one of $CF_3SO_3^-$, $ClO_4^-$, $BF_4^-$, $AsF_6^-$. u is the ratio of [A] to $\{[N=P(Z)_2] \cdot (MX)_v\}_w$ and is a real number from 0 to 5. v is the ratio of (MX) to $[N=P(Z)_2]$ and is a real number from 0.001 to 5. w is an integer from 3 to 200,000.

4 Claims, 1 Drawing Sheet

ALL SOLID-STATE BATTERY

BACKGROUND OF THE INVENTION

The present invention relates to all solid-state batteries.

Many proposals have heretofore been made for lithium batteries of high energy density wherein the electrolyte is a nonaqueous solvent of high ion conductivity, the negative electrode active substance is lithium, and the positive electrode active substance is a substance having high electron conductivity and voids capable of accepting many lithium ions. Especially, a strong demand has been made in recent years for the type or form of batteries in respect of compactness, lightweightness, reduced thickness, etc., with demand also made for amenability to high-temperature ambient conditions or superhigh vacuum ambient conditions. To meet these demands, improvements have been made in liquid electrolytes which have been the greatest problem, with efforts devoted to the development of solid electrolytes with no boiling point or no vapor pressure. Active research is presently under way on high polymer materials which can be adhered completely to the negative electrode material and to the positive electrode material at the interface of adhesion, and which are capable of giving flexibility to the interface of adhesion. For example, heretofore proposed as such high polymer solid electrolytes are polyethylene oxide (PEO) and polypropylene oxide (PPO) compounds in JP-B-3422/1988, "CHARGEABLE ELECTROCHEMICAL POWER GENERATOR," polyphenylene oxide, polysulfone and polyvinylidene chloride compounds in JP-B-30807/1975, "SOLID ELECTROLYTE FILM," N-alkoxymethyl nylon compounds in JP-B-45797/1976, "SEMI-SOLID ELECTROLYTE," and pyridine-pyrrole compounds in JP-A-49490/1977, "PROCESS FOR PREPARING LITHIUM ION CONDUCTIVE SOLID ELECTROLYTE." Further polyphosphazene compounds are proposed in J. Am. Chem. Soc., Vol. 106, 6854~6855 (1984).

However, these proposed high polymer solid electrolytes have problems. First, they are too low in ion conductivity for use as electrolytes in lithium batteries which are actually usable. Even the highest of the ion conductivities of the proposed high polymer solid electrolytes is $10^{-5} \sim 10^{-6}$ S/cm. The conductivity is as low as $10^{-6} \sim 10^{-7}$ S/cm especially at room temperature. Second, they are very low in the transportation value of the mobile cation $Li^+$. The proposed high polymer solid electrolyte is of the biionic type wherein both dissociated cation and anion of an inorganic lithium salt dissolving in the electrolyte move toward the positive electrode and the negative electrode at the same time, so that the transportation value of $Li^+$ becomes small. Accordingly, when the proposed high polymer solid electrolytes are used for fabricating lithium batteries, the batteries obtained are only those of poor charge-discharge characteristics which give only a low current of small current density.

An object of the present invention is to overcome the foregoing problems and provide an all solid-state battery which is small-sized and lightweight and which has a large charge-discharge capacity and outstanding characteristics.

SUMMARY OF THE INVENTION

The present invention provides an all solid-state battery comprising a compound represented by $[A]u.(\{[N=P(Z)_2].(MX)v\}w)$ and serving as a solid electrolyte, a positive electrode active substance and a negative electrode active substance.

a) A is a single ionic polymer comprising one, or an optional arrangement of at least two, of oligoethylene oxypolyphosphazene compounds having a sulfone group and oligoalkyleneoxypolyphosphazene compounds having a fluoroalkylsulfone group, or a mixture of such compounds, the compounds being each represented by one of the segments (I), (II), (III) and (IV):

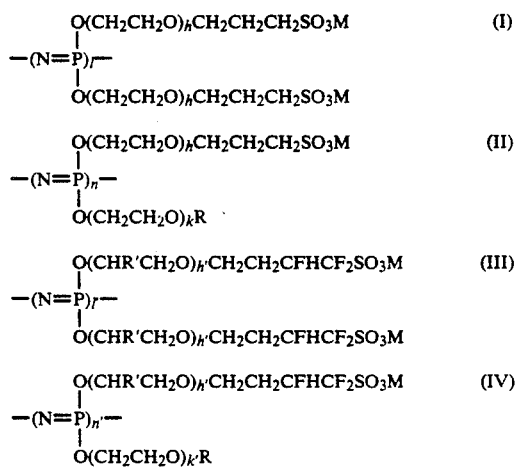

wherein R is one or a combination of methyl, ethyl and propyl, R' is hydrogen or methyl, h and k, or h' and k' are each the average number of repeating ethyleneoxy units or alkyleneoxy units and are each a real number in the range of $0 \leq h \leq 20$, $0 \leq k \leq 20$, $0 \leq h' \leq 20$ or $0 \leq k' \leq 20$, and l, n, l' and n' are each an integer of 0 or greater and in the range of $3 \leq l+n+l'+n' \leq 200000$.

b) u is the ratio of [A] to the oligoethyleneoxypolyphosphazene compound $\{[N=P(Z)_2].(MX)v\}w$ and is a real number in the range of $0 \leq u \leq 5$.

c) Z is a group represented by $Y-(OCH_2CH_2)_y-O-$ wherein Y is one or a combination of methyl, ethyl and propyl, and y is a real number in the range of $1 \leq y \leq 30$.

d) M is an element selected from among main group and subgroup of Groups I and II, transition metal from Groups III to VIII, and lanthanide.

e) X is an anion selected from the group consisting of $CF_3SO_3^-$, $ClO_4^-$, $BF_4^-$, $AsF_6^-$, $PF_6^-$ or a mixture of such anions.

f) v is the ratio of (MX) to the oligoethyleneoxypolyphosphazene $[N=P(Z)_2]$ and is a real number in the range of $0.001 \leq v \leq 5$.

g) w is an integer in the range of $3 \leq w \leq 2000000$.

According to the present invention, a lithium ion single ionic polymer comprising one or at least two of oligoethylene oxypolyphosphazene compounds having a sulfone group and oligoalkyleneoxypolyphosphazene compounds having a fluoroalkysulfone group are used as combined with an oligoethylene oxypolyphosphazene compound $\{[N=P(Z)_2].(MX)v\}w$. This greatly improves the transportation value of the $M^+$ ion, further affording greatly improved ion conductivity. We have found that when incorporating this high polymer solid electrolyte, batteries can be remarkably improved over the lithium batteries heretofore proposed in charge-discharge efficiency, charge-discharge cycle characteristics and current density.

In the foregoing formulae, h and k, or h' and k' are each in the corresponding range of $0 \leq h \leq 20$, $0 \leq k \leq 20$, $0 \leq h' \leq 20$ or $0 \leq k' \leq 20$. If h, k, h' and k' are each greater than 20, the mobility of side-chain molecules greatly decreases to result in greatly reduced ion conductivity. In view of ion conductivity, the value of h, k, h' and k' are each preferably about 6 to about 8. l, n and l and n', although not specified, are each preferably an integer which is 0 or greater and which satisfies the expression $3 \leq l + n + l' + n' \leq 200000$.

M is, for example, an element selected from among main group and subgroup of Groups I and II of the Periodic Table, and a transition metal from Groups III to VIII thereof. Also usable is a cation selected from among lanthanides. Examples of such elements are lithium, sodium, potassium, strontium, magnesium, copper, zinc, silver and like cations. The value of u is a real number in the range of $0 < u \leq 5$. Insofar as the value of y is a real number of at least 1, the requirements of the invention can be satisfied, but it is preferably up to 30. X which represents an anion for forming a salt with the cation M is preferably $CF_3SO_3^-$, $ClO_4^-$, $BF_4^-$, $AsF_6^-$ or $PF_6^-$ although not limited specifically. One or at least two of these anions are usable. v is preferably in the range of $0.001 \leq v \leq 5$. If v is smaller than 0.001, the ion conductivity required of the solid electrolytes for batteries is not available, whereas if it is greater than 5, it becomes difficult for MX to dissolve in the solid electrolyte, forming an unhomogenous solid electrolyte to result in extremely poor battery performance. Although not limited specifically, w can be in the range of $3 \leq w \leq 200000$ in the present invention.

Table 1 shows the results obtained by measuring the $Li^+$ ion conductivity and $Li^+$ ion transportation value of high polymer solid electrolytes of the invention. These electrolytes are very high in ion conductivity and $Li^+$ ion transportation value at room temperature conditions for use. For comparison, the ion conductivity of only the polyphosphazene base disclosed in J. Am. Chem. Soc., Vol. 106, 6854~6855 (1984) is $10^{-12} \sim 10^{-7}$ S/cm.

A homogeneous solid electrolyte film can be prepared from the high polymer solid electrolyte by dissolving the electrolyte in a nonaqueous solvent capable of dissolving the same, such as tetrahydrofuran (THF), dioxane, dimethoxyethane or like ether, acetone, methyl ethyl ketone or like ketone, methanol, ethenol or like alcohol, acetonitrile, propylene carbonate or the like, forming a coating from the solution, and drying the coating. Alternatively, it is possible to obtain a film or sheet directly from the electrolyte by a molding machine or with use of a mold without using any solvent.

Positive electrode active substances usable for the present invention are those generally used for lithium batteries. Preferred examples of such substances are compounds having a layer structure such as $TiS_2$, graphite and $(V_2O_5)_{1-x}.(B)_x.mH_2O$ (wherein B is an oxide of metal or semi-metal, $0 \leq x \leq 0.6$, and $0.1 \leq m \leq 2$), compounds having an amorphous structure such as amorphous $(V_2O_5)_{1-x}.(B)_x$ (wherein B is an oxide of metal or semi-metal, $0 \leq x \leq 0.6$), $MoS_2$, $MoS_3$, $V_2S_5$ and $LiV_3O_8$, and compounds having voids in a three-dimensional crystal lattice such as $MnO_2$, $LiMn_2O_4$, $V_2O_5$ and $V_6O_{13}$.

The compound $(V_2O_5)_{1-x}.(B)_x.mH_2O$ of layer structure is a gel film which is prepared by dissolving the amorphous material $(V_2O_5)_{1-x}.(B)_x$ in water to obtain a sol, or pouring the amorphous material in a molten state directly into water to obtain a sol, or hydrolyzing a desired combination of vanadium alcoholate and alcoholate of element B to obtain a sol, and forming a coating of the sol, followed by drying. Use of this positive electrode active substance affords a positive electrode material in the form of a thin film, so that lithium batteries of the film type can be fabricated. The other positive electrode active substances can be used when made into a desired form by being molded as it is or as admixed with polytetrafluoroethylene or like binder and acetylene black or like electron conductivity imparting agent. Also usable are positive electrode materials in the form of a thin film and prepared by vacuum evaporation or sputtering.

The negative electrode active substance to be used in the present invention is metallic Li or an Li alloy such as Li-Al alloy in the form of pellets, foil, film or deposited film obtained by vacuum evaporation or sputtering.

BRIEF DESCRIPTION OF THE DRAWINGS

Next, a typical example of battery construction of the invention will be described.

Figure 1:
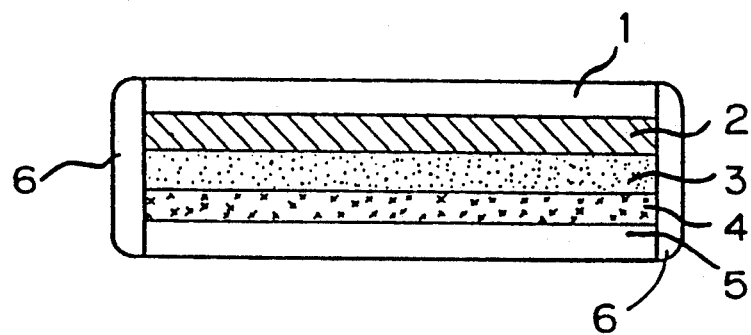
FIG. 1 is a sectional view schematically showing a solid-state battery in the form of a film and embodying the present invention. The battery components are superposed in layers into the construction shown in FIG. 1. Particularly, a process will be described for fabricating an all solid-state lithium battery in the form of a film. Indicated at 1 is a collecting electrode (negative electrode) substrate, at 2 metallic lithium, at 3 a high polymer solid electrolyte, at 4 a positive electrode active substance, at 5 a collecting electrode (positive electrode) substrate, and at 6 a sealing agent.

First, the surface of a sheet ($30\mu$ in thickness) of stainless steel or nickel serving as a collecting electrode substrate is coated by a brush with a sol of $(V_2O_5).mH_2O$ (2 wt. % aqueous solution, calculated as $V_2O_5$) serving at the positive electrode active substance, then dried at 80° C. for 30 minutes and at 200° C. for 10 minutes and placed into a closed glow box with a dry Ar gas atmosphere. The surface of the resulting gel film of $V_2O_5.mH_2O$ was coated with a high polymer solid electolyte (2 wt. % solution in THF), and the THF solvent is dried. At this time, a nonwoven fabric (made of polypropylene, polyethylene, cellulose or inorganic fiber, e.g., paper made of one or a mixture of at least two of alumina fiber, titania fiber, $SiO_2$ fiber, carbon fiber and the like) impregnated with the high polymer electrolyte may be placed over the gel film of $V_2O_5.mH_2O$.

On the other hand, a sheet ($30\mu$ in thickness) of stainless steel or nickel as the negative electrode collector substrate is clad with Li metal foil ($30\mu$ in thickness) serving as the negative electrode active substance. The high polymer solid electrolyte formed over the positive electrode substrate and the negative electrode lithium cladding are superposed on each other, and the assembly is sealed off from outside with a sealing agent. These steps of battery fabrication are of course performed in a atmosphere of dry air or dry Ar gas. The all solid-state battery thus prepared according to the invention is reduced in charge-discharge capacity, small-sized, lightweight and high in energy density.

BEST MODE OF CARRYING OUT THE INVENTION

The present invention will be described in greater detail with reference to the following examples. However, the invention is not limited only to the examples given below. Batteries were fabricated entirely in a dry Ar gas atmosphere.

EXAMPLE 1

Solid-state lithium batteries in the form of a film and having the construction of FIG. 1 were fabricated.

Table 2 shows the materials and conditions for the fabrication of the batteries. Table 3 shows the characteristics of the batteries. The high polymer solid electrolytes used were those listed in Table 1. SUS304 was used for collector substrates. The positive electrode active substance was 5 to $0.1\mu$ in particle size. Z in the table represents $CH_3-(OCH_2CH_2)_Y-O-$.

Each of the batteries was charged and discharged at a constant current of 100 $\mu A$ between 4 V and 2 V to determine the capacity retentivity of the battery in each cycle (the initial discharge capacity taken as 100%).

TABLE 1

| | $[A]_u \cdot (\{[N=P(Z)_2] \cdot (LiX)_v\}_w)$ | | | | | | | | | | |
|---|---|---|---|---|---|---|---|---|---|---|---|
| | $[A]_u$ | | | | | | | | | | |
| No. | A | b | k | h' | k' | l | n | l' | n' | R | R' | u |
| E-1 | (I) | about 7 | — | — | — | 100~20000 | — | — | — | $CH_3$ | — | 0.1 |
| E-2 | (II) | about 7 | about 7 | — | — | — | 100~20000 | — | — | $CH_3$ | — | 0.10 |
| E-3 | (III) | — | — | about 7 | — | — | — | 100~20000 | — | $CH_3$ | H | 0.10 |
| E-4 | (IV) | — | — | about 7 | about 7 | — | — | — | 100~20000 | $CH_3$ | H | 0.10 |
| E-5 | (I) (II) | about 7 | about 7 | — | — | 100~20000 | 100~20000 | — | — | $C_2H_5$ | — | 0.10 |
| E-6 | (III) (IV) | — | — | about 7 | about 7 | — | — | 100~20000 | 100~20000 | $C_2H_5$ | $CH_3$ | 0.10 |
| E-7 | (I) (II) (III) (IV) | about 7 | about 7 | about 7 | about 7 | 100~20000 | 100~20000 | 100~20000 | 100~20000 | $CH_3$ | H | 0.10 |
| E-8 | (I) (II) | about 2 | about 18 | — | — | 3~10000 | 3~10000 | — | — | $CH_3$ | — | 5.0 |
| E-9 | (I) (II) | about 18 | about 2 | — | — | 1000~100000 | 1000~100000 | — | — | $C_2H_5$ | — | 1.0 |
| E-10 | (I) (II) | about 7 | about 7 | — | — | 500~50000 | 100~20000 | — | — | $C_3H_7$ | — | 0.1 |
| E-11 | (III) (IV) | — | — | about 2 | about 18 | — | — | 3~10000 | 3~10000 | $CH_3$ | $CH_3$ | 5.0 |
| E-12 | (III) (IV) | — | — | about 18 | about 2 | — | — | 1000~100000 | 1000~100000 | $C_2H_5$ | $CH_3$ | 1.0 |
| E-13 | (III) (IV) | — | — | about 7 | about 7 | — | — | 500~70000 | 50~10000 | $C_3H_7$ | H | 0.1 |
| E-14 | (I) (II) (III) (IV) | about 2 | about 2 | about 2 | about 2 | 3~10000 | 1000~100000 | 500~30000 | 50~10000 | $CH_3$ | $CH_3$ | 0.1 |
| E-15 | (I) (II) (III) (IV) | about 18 | about 20 | about 20 | about 18 | 1000~100000 | 3~10000 | 3~10000 | 1000~100000 | $C_3H_7$ | H | 0.1 |
| Com. Ex. | — | — | — | — | — | — | — | — | — | $CH_3$ | — | 0 |

| | $[A]_u(\{[N=P(Z)_2] \cdot (LiX)_v\}_w)$ | | | | Ion conductivity | Ion transportation value |
|---|---|---|---|---|---|---|
| | (Z) | (LiX)$_v$ | | | | |
| No. | y | X | v | w | S/cm (30° C.) | (Li+) 30° C. |
| E-1 | about 7 | $ClO_4^-$ | 0.05 | 10~10000 | $7.0 \times 10^{-4}$ | 0.8 |
| E-2 | about 7 | $ClO_4^-$ | 0.05 | 10~10000 | $1.0 \times 10^{-3}$ | 0.8 |
| E-3 | about 7 | $ClO_4^-$ | 0.05 | 10~10000 | $8.0 \times 10^{-4}$ | 0.8 |
| E-4 | about 7 | $ClO_4^-$ | 0.05 | 10~10000 | $2.0 \times 10^{-3}$ | 0.8 |
| E-5 | about 2 | $BF_4^-$ | 0.05 | 10~10000 | $1.0 \times 10^{-3}$ | 0.8 |
| E-6 | about 7 | $AsF_6^-$ | 0.05 | 10~10000 | $3.0 \times 10^{-3}$ | 0.8 |
| E-7 | about 7 | $PF_6^-$ | 0.05 | 10~10000 | $3.0 \times 10^{-3}$ | 0.8 |
| E-8 | about 1 | $PF_6^-$ | 5.0 | 100~50000 | $7.0 \times 10^{-3}$ | 0.9 |
| E-9 | about 15 | $BF_4^-$ | 0.10 | 1000~100000 | $3.0 \times 10^{-3}$ | 0.9 |
| E-10 | about 30 | $ClO_4^-$ | 0.001 | 3000~200000 | $3.0 \times 10^{-4}$ | 0.8 |
| E-11 | about 1 | $PF_6^-$ | 5.0 | 100~50000 | $1.0 \times 10^{-2}$ | 0.9 |
| E-12 | about 15 | $BF_4^-$ | 0.10 | 1000~100000 | $4.0 \times 10^{-3}$ | 0.9 |
| E-13 | about 30 | $ClO_4^-$ | 0.001 | 3000~200000 | $3.0 \times 10^{-4}$ | 0.8 |
| E-14 | about 2 | $CF_3SO_3^-$ | 0.05 | 100~20000 | $4.0 \times 10^{-3}$ | 0.8 |
| E-15 | about 10 | $ClO_4^-$ | 0.05 | 100~20000 | $2.0 \times 10^{-3}$ | 0.8 |
| Com. Ex. | about 2 | $ClO_4^-$ | 0.10 | 10~20000 | $5.0 \times 10^{-7}$ | 0.2 |

TABLE 2

| | Positve electrode material | | | |
|---|---|---|---|---|
| No. | Positive electrode active substance | Additive | Fabricating method | Shape |
| P-1 | $TiS_2$ | — | Vacuum evaporation ($2 \times 10^{-5}$ Torr, 1 hr-evaporation) | 10-$\mu$ film on SUS 304 |

TABLE 2-continued

| | Positve electrode material | | | |
|---|---|---|---|---|
| No. | Positive electrode active substance | Additive | Fabricating method | Shape |
| P-2 | Graphite | Polytetrafluoro-ethylene 10 wt % | Sheet forming by press | 0.5 mm-sheet |
| P-3 | $(V_2O_5) \cdot mH_2O$ | — | Coat and drying | 10-$\mu$ film on SUS |
| P-4 | $(V_2O_5)_{75} \cdot GeO_2 \cdot mH_2O$ | — | Coat and drying | 10-$\mu$ film on SUS |
| P-5 | $(V_2O_5)_{95} \cdot Nb_2O_5 \cdot mH_2O$ | — | Coat and drying | 10-$\mu$ film on SUS |
| P-6 | Amorphous $(V_2O_5)_{0.95} \cdot (P_2O_5)_{0.05}$ | Polytetrafluoro-ethylene 5 wt % Acetylene black 10 wt % | Sheet forming by press | 0.5 mm-sheet |
| P-7 | Amorphous $(V_2O_5)_{0.90} \cdot (Nb_2O_5)_{0.10}$ | Polytetrafluoro-ethylene 5 wt % Acetylene black 10 wt % | Sheet forming by press | 0.5 mm-sheet |
| P-8 | $MoS_2$ | Polytetrafluoro-ethylene 5 wt % Acetylene black 10 wt % | Sheet forming by press | 0.5 mm-sheet |
| P-9 | $LiV_3O_8$ | Polytetrafluoro-ethylene 5 wt % Acetylene black 10 wt % | Sheet forming by press | 0.5 mm-sheet |
| P-10 | $MnO_2$ | Polytetrafluoro-ethylene 5 wt % Acetylene black 10 wt % | Sheet forming by press | 0.5 mm-sheet |
| P-11 | $LiMn_2O_4$ | Polytetrafluoro-ethylene 5 wt % Acetylene black 10 wt % | Sheet forming by press | 0.5 mm-sheet |
| P-12 | $V_2O_5$ | Polytetrafluoro-ethylene 5 wt % Acetylene black 10 wt % | Sheet forming by press | 0.5 mm-sheet |
| P-13 | $V_6O_{13}$ | Polytetrafluoro-ethylene 5 wt % Acetylene black 10 wt % | Sheet forming by press | 0.5 mm-sheet |
| P-14 | $(V_2O_5) \cdot mH_2O$ $LiMn_2O_4$ | Disperse 70 wt % $LiMn_2O_4$ into a sol | Sheet forming by press | 0.5 mm-sheet |

TABLE 3

| Battery No. | Material for battery | | | | Shape of battery | Property capacity retentivity (after 100 cycles) |
|---|---|---|---|---|---|---|
| | Positive electrode | Electro-lyte | Negative electrode | Sealing agent | | |
| 1 | P-1 | E-1 | Li metal (t = 30 $\mu$) | Epoxy resin | Card 50 × 30 × 0.5 (mm) | 88(%) |
| 2 | P-2 | E-2 | Li metal (t = 30$\mu$) | " | Size AA (SUM-3) Roll | 90(%) |
| 3 | P-3 | E-3 | Li metal (t = 30 $\mu$) | " | Card 50 × 30 × 0.5 (mm) | 89(%) |
| 4 | P-4 | E-4 | Li metal (t = 30 $\mu$) | " | Card 50 × 30 × 0.5 (mm) | 88(%) |
| 5 | P-5 | E-5 | Li metal (t = 30 $\mu$) | " | Card 50 × 30 × 0.5 (mm) | 89(%) |
| 6 | P-6 | E-6 | Li metal (t = 30 $\mu$) | " | Size AA (SUM-3) Roll | 89(%) |
| 7 | P-7 | E-7 | Li metal (t = 30 $\mu$) | " | Button $\phi$20 × 2.0 t (mm) | 91(%) |
| 8 | P-8 | E-8 | Li metal (t = 30 $\mu$) | " | Button $\phi$20 × 2.0 t (mm) | 90(%) |
| 9 | P-9 | E-9 | Li Metal (t = 30 $\mu$) | " | Button $\phi$20 × 2.0 t (mm) | 91(%) |
| 10 | P-10 | E-10 | Li metal (t = 30 $\mu$) | " | Button $\phi$20 × 2.0 t (mm) | 87(%) |
| 11 | P-11 | E-11 | Li metal (t = 30 $\mu$) | " | button $\phi$20 × 2.0 t (mm) | 89(%) |
| 12 | P-12 | E-12 | Li metal (t = 30 $\mu$) | " | Button $\phi$20 × 2.0 t (mm) | 90(%) |
| 13 | P-13 | E-13 | Li metal (t = 30 $\mu$) | " | Button $\phi$20 × 2.0 t (mm) | 91(%) |
| 14 | P-14 | E-14 | Li metal (t = 30 $\mu$) | " | Button $\phi$20 × 2.0 t (mm) | 91(%) |
| 15 | P-3 | E-15 | Li metal | " | Button | 89(%) |

TABLE 3-continued

| Battery No. | Material for battery | | | Sealing agent | Shape of battery | Property capacity retentivity (after 100 cycles) |
|---|---|---|---|---|---|---|
| | Positive electrode | Electrolyte | Negative electrode | | | |
| 16 | P-3 | Com. Ex. | Li metal (t = 30 μ) | " | φ20 × 2.0 t (mm) Button | ( 1) |
| 17 | P-3 | E-5 | Li metal (t = 30 μ) | Polypropylene | φ20 × 2.0 t (mm) Card 50 × 30 × 0.5 (mm) | 91(%) |
| 18 | P-3 | E-6 | Li metal (t = 30 μ) | " | Card 50 × 30 × 0.5 (mm) | 90(%) |
| 19 | P-3 | E-7 | Li metal (t = 30 μ) | " | Card 50 × 30 × 0.5 (mm) | 91(%) |
| 20 | P-6 | E-5 | Li metal (t = 30 μ) | " | Card 50 × 30 × 0.5 (mm) | 89(%) |
| 21 | P-10 | E-6 | Li metal (t = 30 μ) | " | Card 50 × 30 × 0.5 (mm) | 90(%) |
| 22 | P-11 | E-6 | Li$_{30}$Al$_{70}$ (t = 30 μ) | " | Card 50 × 30 × 0.5 (mm) | 89(%) |

( 1) Dischargeable only once, not rechargeable. Non-restorable.

INDUSTRIAL APPLICATION

The battery of the present invention can be fabricated in any configuration, for example, in the form of a coin, sheet, film or jelly roll, or as incorporated in the contemplated device, or as prepared in the form of a printed battery by printing. Thus, the battery can be designed with increased freedom and repeatedly chargeable. Since the present battery is of the all solid-state type, it is usable under high-temperature ambient conditions or superhigh vacuum ambient conditions and therefore has the advantage of being usable in various fields.

We claim:

1. A solid-state battery comprising a positive electrode, a negative electrode, and a solid electrolyte represented by $$[A]_u \cdot (\{[N=P(Z)_2] \cdot (MX)_v\}_w)$$

wherein a) A is a single ionic polymer is at least one of
  i) an oligoethylene oxypolyphosphazene compound having a sulfone group or
  ii) an oligoalkylene oxypolyphosphazene compound having a fluoroalkylsulfone group, the respective oxypolyphosphazenes having a structure represented by one of formulas (I), (II), (III), and (IV):

$$-[N=P]_l- \begin{array}{c} O(CH_2CH_2O)_h CH_2CH_2CH_2SO_3M \\ | \\ O(CH_2CH_2O)_h CH_2CH_2CH_2SO_3M \end{array} \quad (I)$$

$$-[N=P]_n- \begin{array}{c} O(CH_2CH_2O)_h CH_2CH_2CH_2SO_3M \\ | \\ O(CH_2CH_2O)_k R \end{array} \quad (II)$$

$$-[N=P]_l- \begin{array}{c} O(CHR'CH_2O)_{h'} CH_2CH_2CFHCF_2SO_3M \\ | \\ O(CHR'CH_2O)_{h'} CH_2CH_2CFHCF_2SO_3M \end{array} \quad (III)$$

$$-[N=P]_{n'}- \begin{array}{c} O(CHR'CH_2O)_{h'} CH_2CH_2CFHCF_2SO_3M \\ | \\ O(CH_2CH_2O)_{k'} R \end{array} \quad (IV)$$

R is one or a combination of methyl, ethyl and propyl, R' is hydrogen or methyl, h and k, or h' and k' are each the average number of repeating ethyleneoxy units or alkyleneoxy units and are each a real number in the range of 0≦h≦20, 0≦k≦20, 0≦h'≦20, 0≦k'≦20, and l, n, l' and n' are each an integer of 0 or greater and in the range of 3≦l+n+l'+n'≦200,000;

b) Z is a group represented by Y—(OCH$_2$CH$_2$)$_y$—O— wherein Y is one or a combination of methyl, ethyl and propyl, and y is a real number in the range of 1≦y≦30;

c) M is an element selected from the main group and subgroup of Groups I and II, transition metals from Groups III to VIII, and lanthanide;

d) X is at least one anion selected from the group consisting of CF$_3$SO$_3^-$, ClO$_4^-$, BF$_4^-$, AsF$_6^-$, PF$_6^-$;

e) u is the ratio of [A] to $\{[N=P(Z)_2] \cdot (MX)_v\}_w$ and is a real number in the range of 0<u≦5;

f) v is the ratio of (MX) to [N=P(Z)$_2$] and is a real number of 0.001≦v≦5; and g) w is an integer in the range of 3≦w≦200,000.

2. A solid-state battery as defined in claim 1, wherein the positive electrode comprises at least one compound selected from compounds having a layer structure, compounds having an amorphous structure and compounds having a three-dimensional crystal lattice containing voids.

3. A solid-state battery as defined in claim 2 wherein said compound having a layer structure is at least one member selected from TiS$_2$, graphite, and (V$_2$O$_5$)$_{1-x}$(B)$_x$ mH$_2$O, wherein B is an oxide of a metal or a semi-metal, 0≦x≦0.6, and 0.1≦m≦2; said compound having an amorphous structure is at least one member selected from amorphous (V$_2$O$_5$)$_{1-x}$(B)$_x$, wherein B is an oxide of a metal or a semi-metal, 0≦x≦0.6, MoS$_2$, MoS$_3$, V$_2$S$_5$, and LiV$_3$O$_8$; and said compound having voids in a three-dimensional crystal lattice is at least one member selected from MnO$_2$, LiMn$_2$O$_4$, V$_2$O$_5$, and V$_6$O$_{13}$.

4. A solid-state battery as defined in claim 1, wherein said negative electrode is metallic lithium or a lithium alloy.

* * * * *